United States Patent [19]
Crimmel et al.

[11] 3,847,655

[45] Nov. 12, 1974

[54] FAST COLORING OF GLASS FIBERS AND GLASS FABRICS

[75] Inventors: Harry W. Crimmel, Warwick; Emanuel G. Terezakis, Cumberland; Phyllis A. Sutula, Woonsocket; all of R.I.

[73] Assignee: Owens-Corning Fiberglas Corporation, Toledo, Ohio

[22] Filed: Dec. 7, 1972

[21] Appl. No.: 313,036

[52] U.S. Cl.................... 117/126 GQ, 117/126 GB
[51] Int. Cl............................................. C03c 25/02
[58] Field of Search............ 117/DIG. 3, 62.1, 62.2, 117/126, 126 GB, 126 GQ; 162/162; 8/34, 35, 21, 31

[56] References Cited
UNITED STATES PATENTS

| | | | |
|---|---|---|---|
| 2,381,587 | 8/1945 | Griffin et al. | 117/DIG. 3 |
| 2,854,354 | 9/1958 | Gottlieb | 117/DIG. 3 |
| 3,128,222 | 4/1964 | Heushler et al. | 162/162 |

OTHER PUBLICATIONS
Carleton Ellis; Printing Inks; 1940; pages 237–238: Reinhold Publishing Co.

*Primary Examiner*—David Klein
*Assistant Examiner*—Alfonso T. Suro Pico
*Attorney, Agent, or Firm*—Carl G. Staelin, John W. Overman

[57] ABSTRACT

A new and improved process for coloring glass fibers and glass fiber fabrics is provided, whereby a composition comprising water insoluble organic colorants, solubilized and/or dispersed in water-miscible organic solvents, is applied to glass fibers and to glass fiber fabrics having a pretreatment thereon. The glass fibers and glass fiber fabrics, while still wet with the colorant-solvent composition, are subjected to sufficient water to cause the colorant to adhere tenaciously to the glass fiber and glass fiber fabrics, whereby brilliant, deep shades are obtained. Subsequently, the glass fibers and glass fiber fabrics, having the colorant thereon, are dried and are optionally finished with a material which enhances the durability of the glass fibers and glass fiber fabrics.

24 Claims, No Drawings

FAST COLORING OF GLASS FIBERS AND GLASS FABRICS

BACKGROUND OF THE INVENTION

This invention relates to the art of coloring glass fibers and particularly to coloring glass fibers in the form of strands, yarns and fabrics, wherein fast coloring of the glass fibers is accomplished via a polar solvent medium.

Conventional dyeing or coloring of glass fibers, as taught by the prior art, has been achieved through coating the glass fibers in the form of yarns and fabrics with a resinous binder in which a coloring agent, such as pigment, has been dispersed and then curing the treated glass fibers. Numerous binders of various kinds, such as melamines, acrylics and urethanes have been employed in this manner to help maintain the colorfastness of the treated glass fibers. Although the conventional dyeing methods possessed such characteristics as ease of application and good lightfastness of the pigments used, there were numerous disadvantages, including the loss of "hand" or an increased stiffness in the treated glass fibers as compared to undyed glass fibers. Furthermore, with many of the prior art treatments, the treated glass fibers or fabrics had to be washed or scoured to obtain acceptable hand. Other disadvantages, including an apparent inability to develop deep shades or brilliant colors and the loss of non-flammability characteristics in the treated glass fibers, were attributable to the use of resinous binders which comprised about 4–5 percent by weight of the glass fibers. Additionally, these conventional dyeing methods usually required that any protective sizings on the glass fibers be removed prior to dyeing.

Solution dyes were thought to be an answer to some of the above-described problems, but solution dyes did not provide depth of color to the glass fibers, and lightfastness and washfastness properties of these colored glass fibers were not generally acceptable. Even though solution dyes can fully penetrate a glass fiber bundle, the dyes migrate to the outer surfaces upon drying of the bundle, and the colored glass fibers are not crockfast.

We have now discovered a method to achieve bright, deep, durable colors on textiles, particularly glass fibers, whether in strand, yarn or fabric form, with conventional apparatus. This method produces deep, bright shades which are lightfast and washfast without impairing the hand of the textiles or the non-flammability characteristics thereof. Furthermore, any protective sizing which is on the textiles does not have to be removed prior to coloring the glass fibers. In fact it is preferred to have a sizing or other organic material on the textiles prior to coloring the glass fibers.

SUMMARY OF THE INVENTION

The invention comprises the use of compositions, comprising various organic, water-insoluble colorants which are capable of being dissolved and/or dispersed in water-miscible organic solvents, on textiles, especially glass fibers. Glass fibers in the form of strands, yarns or fabrics, preferably having a dried deposit of an organic material thereon to receive the colorants, are subjected to the colorant-solvent composition, and while wet, the glass fibers are exposed to sufficient water to cause the colorant from the composition when in solution, to precipitate, in situ, on the glass fibers. Even when the composition is a dispersion, rather than a solution, and the composition is applied to glass fibers, water disrupts the dispersion, in situ, on the glass fibers. The net effect of the water flush on the composition, whether the colorant in the composition is in solution, dispersion or whether the colorant is partially in solution and partially in dispersion, is to cause the colorant to adhere very strongly to the glass fibers. The adherence of the colorant, in particulate form, to the glass fibers and the amount of colorant on the glass fibers improves when the glass fibers are pretreated with an organic material. This improved or intensified adherence is evidenced by deeper, more brilliant colors on the pretreated glass fibers as compared to the fainter, duller colors on untreated or bare glass fibers.

A possible explanation of the very deep shades of color attainable via the concepts of this invention is that by the absence of resinous materials, high concentrations of colorant, in particulate form, are present, throughout and on the surfaces of each of the glass fibers in a glass fiber yarn, strand or fabric. Previously, when resinous materials were combined with pigments the resinous materials would function as a filtering means to prevent the pigment particles from reaching the surfaces of all of the glass fibers that constitute a glass fiber strand, yarn or fabric. Therefore, only the outer glass fibers of the strand, yarn and fabric received the pigment, thereby limiting the depth of color thereof. With only the outer glass fibers of the strand, yarn and fabric having pigment thereon, the colored glass fibers possessed poor reflective properties, thereby limiting the depth of color of the glass fibers. When additional pigment-binder composition was applied to the glass fiber strand, yarn and fabric, the color would become darker, but not brighter, and other desirable properties, such as hand, wrinkle recovery and fire proofness were adversely affected because of the high amounts of binder applied thereto.

Applying the concepts of this invention to glass fibers of strands, yarns and fabrics, the solubilized or finely dispersed colorant, without the use of a resinous binder, fully penetrates the strand, yarn and fabric, so that when the colorant is caused to come out of solution and/or caused to be taken out of dispersion, the transparent or translucent properties of the glass fibers, which in the past had acted adversely against obtaining depth of color, is obviated. It is thought that when the water flush is applied to the colored glass fibers, the colorant agglomerates, in situ, on and between the glass fibers, whether the colorant, prior to the water flush is in the form of a solution, dispersion or partial solution/dispersion. This agglomeration appears to be evidenced by the fact that after the water flush, the particle size of the colorant is larger than the original particle size of the colorant.

Furthermore, since the colorant has fully penetrated the glass strand, yarn and fabric, its durability is materially increased. Normal or conventional dynamic use of the glass strand, yarn and fabric will not subject the same to crocking since the colorant lies mostly between the multiplicity of glass fibers that constitute a strand, yarn or fabric. A simple protective finish will further the durability of the colored glass strands, yarns and fabrics without destroying the desirable characteristics of hand, wrinkle recovery and non-flammability.

Glass fibers, in the form of strands, yarns and fabrics when treated by the concepts of this invention, possess a substantial improvement in depth and brilliance of color and a substantial improvement in the hand of the glass fibers when compared to the color and hand of glass fibers finished or treated according to prior art teachings. Likewise, there is a substantial improvement in such properties as crockfastness, lightfastness and washfastness of the colored glass fibers when treated in accordance with this invention. Not to be overlooked is the fact that with this invention decorative glass fibers are obtained, which do not substantially impair the non-flammability characteristics inherent with untreated glass fibers.

The above-mentioned advantages are made possible by the concepts of the invention, it is thought, because the colorant-solvent system does not contain a resinous material, although the pretreatments and post-treatments for the colored glass fibers do use small amounts of resinous materials. This is a material departure from the prior art teachings wherein it is taught that it is necessary to employ a substantial amount of resinous material in addition to colorant, in order to obtain some depth of color on glass fibers. Glass fibers, however, have inherently been very difficult or impossible to color in depth without affecting other desirable properties thereof, such as hand and non-flammability.

It is therefore an object of this invention to treat glass fibers, in the form of filaments, strands, yarns and fabrics, to produce colored glass fibers having depth, lightfastness, washfastness, crockfastness, pleasant hand and non-flammability characteristics.

It is another object of this invention to treat glass fibers with a colorant-solvent composition, which is capable of having the colorant therein precipitated, in situ, on the glass fibers.

It is yet another object of this invention to color glass fibers with a colorant-solvent composition without the aid of resinous binding agents.

These and other objects will become apparent from the following detailed description.

The compositions of this invention that impart brilliant and deep shades of color to textiles, especially to glass fibers, comprise colorants which have been found capable of being combined with water-miscible organic solvents to form solutions, dispersions and partial solutions/dispersions without the aid of surfactants. After the colorant-solvent composition has been applied to glass fibers, the colorant is caused to come out of solution and/or dispersion by flushing the glass fibers with water. A high concentration of the colorant in particulate form is physically adhered to and entrapped between the glass fibers that form the strands, yarns and fabrics, which glass fibers were previously treated to help receive the colorant. For some unexplained reason, the coloring agents from the compositions of this invention, whether in the form of solutions, dispersions or partial solution/dispersion, tenaciously adhere to the glass fibers after the pretreated glass fibers, having the compositions thereon, are subjected to a water flushing. When a coloring agent such as a pigment is put into solution by means of a water-miscible organic solvent and the solution is applied to glass fibers, precipitation of the colorant on the glass fibers occurs, when the colored glass fibers are exposed to sufficient water, yielding a high loading of the colorant between and about the glass fibers making up the strands, yarns and fabrics. When a coloring agent such as a pigment is put into dispersion by means of a water-miscible organic solvent and the dispersion is applied to glass fibers, precipitation or some phenomenon occurs when the colored glass fibers are exposed to sufficient water. This is evidenced by the fact that without the water flushing, the color on the glass fibers is dull, whereas when the colored glass fibers are exposed to a water flushing, the color becomes deep and bright. It is thought that this high loading of colorant on the glass fibers and between the glass fibers constituting a strand, yarn or fabric, helps reflect light, thereby producing brilliant, deeper shades of color to the glass fibers.

After the colorant is precipitated from solution, or caused to come out of dispersion, in situ, on the glass fibers, it may be protected by the application of a material to improve such properties as washfastness, crockfastness and durability. Crockfastness and washfastness properties on the deeply-colored glass fibers were obtained without affecting the hand or the non-flammability characteristics of the glass fibers to any substantial degree. Multiple applications of the colorant-solvent compositions to glass fibers, followed by multiple water flushings to cause precipitation or agglomeration of the colorant have been accomplished on glass fibers in the form of strands, yarns and fabrics. This is especially important because there is no unwanted build up or excess of resinous materials, when applying the colorant to adversely affect the hand or flammability characteristics of the glass fibers.

Because of the extreme brilliance and depth in color of glass fibers treated according to the concepts of this invention, as compared to glass fibers finished via prior art teachings, especially the treatment of filaments of glass fibers having a nominal diameter of about 3.8 microns, the colored glass fibers of this invention find utility in weaver's markets, especially where aesthetic applications are desired or required.

Many pigments, when treated with a water-miscible solvent, do not go into solution and/or are difficult to disperse therein. For example, when azo pigments are treated with a water-miscible solvent such as methanol or ethanol, little or no solvation reaction occurs. This is in accord with references which state that the solvent fastness properties of this colorant against ethanol are very good. Likewise, if the same colorant is treated with a solution of 5 percent sodium hydroxide in water, little or no solvation is observed. Again this is in accord with references which state that the fastness properties of this colorant are unaffected by a 5 percent sodium hydroxide solution. However, if the suspension of azo pigments in ethanol is treated with a very small amount of diluted aqueous caustic or soda ash solution, there is an immediate bathochromic shift of color, for example, yellow to orange, and complete solution occurs. Solvation of some pigments is made easier at elevated temperatures of from about 30°C. to about 40°C. The azo pigments, supposedly insoluble in either of the solvents, are completely soluble in the combination of solvents.

The colorant-solvent compositions of this invention, when in the form of a solution, can be caused to undergo precipitation and to obtain its original color by subjecting the solution to an excess of water. Preferably, acidified water is employed when glass fibers are being treated with a solution and/or dispersion comprising caustic, so that any caustic from the composition is removed from the glass fibers.

The water used to effect precipitation is preferably acidified as stated above when alkali, whether organic or inorganic, is used to help solubilize or disperse colorants in the water-miscible solvents. Any acid, such as formic, acetic, lactic, hydrochloric, sulfuric, phosphoric and the like or combinations thereof, may be used. The pH of this water may range from about 2.5 to about just below 7.0, but preferably ranges from about 3.5 to about 5.5.

Since glass fibers are non-porous and have very smooth surfaces, such that there is substantially nothing to which a coloring agent such as a dye or a pigment might adhere, preparation of these surfaces is necessary prior to applying the colorant-solvent composition thereto in order to obtain deep, bright colors. The patent literature discloses a number of compounds usable for this purpose. For example, U.S. Pat. Nos. 2,273,040 and 2,356,161 disclose the use of mordants on glass fibers. Glass fibers, treated with these or other like compounds which stick to the surface of the glass fibers, are suitable for the purposes of this invention. Werner complex metal compounds of carboxylic acids and organo silanes are also excellent for pretreatment of the glass fiber surfaces prior to application of the colorant-solvent composition of this invention thereto. Generally, any organic material, such as protective sizings, comprising starch-oil or polymeric materials, applied to glass fibers substantially immediately after the glass fibers are formed or attenuated, serves as a pretreatment for glass fibers colored in accordance with the concepts of this invention. Even vinyl coatings, such as plastisols, have been found suitable as pretreatments for glass fibers colored in accordance with the concepts of this invention.

As stated previously, glass fibers have very smooth surfaces, thereby making it difficult to obtain brilliant colors and/or depth of color thereon with normal coloring or dyeing techniques. Previously, colored glass fibers usually lacked depth when pigment particles were dispersed in resins. Although the resins helped bond the pigments to the glass fibers, they presented difficulty in obtaining penetration of the fiber bundle with pigments, especially with yarn comprising glass filaments which have been twisted and plied and are closely packed together in a small unit area. Glass fibers, being transparent or at least translucent in appearance, are difficult to color in depth because of the light that passes therethrough. In order to combat the light passing through the glass fibers, high concentrations of a coloring agent have been thought to be a proper response. However, prior to this invention, when high concentrations of a coloring agent were attempted to be applied to glass fibers, many problems arose, as discussed hereinabove. It is possible, however, with the concepts of this invention, to apply high concentrations of coloring agents on glass fibers without affecting other desirable characteristics of the glass fibers and obtain brilliantly, deeply colored glass fibers.

With the concepts of this invention, total penetration of the glass fiber bundle is obtained. While the glass fiber bundle is still wet with the colorant-solvent composition, the colorant is caused to come out of solution or out of the dispersion, upon being subjected to a sufficient quantity of water to cause insolubility or to destroy the dispersion mechanism, in situ, on the glass fiber bundle. The net effect is that there is a high concentration of particulate colorant adhered to the glass fiber surfaces and entrapped between the glass fibers constituting a strand, yarn or fabric which heretofore has not been attainable. Furthermore, the colorant that has penetrated into the glass fiber bundle, does not migrate to the outer surfaces of the bundle upon drying, probably due to entrapment of the colorant therein and further, probably due to an agglomeration of the colorant particles. The agglomerated colorant particles on and about the glass fibers are larger than the original colorant particles. This appears to be a physical rather than a chemical reaction. The thus treated glass fibers, in the form of bundles, strands, yarns, rovings, fabrics and the like, are preferably treated with a protective coating to help protect the fibers against mutual abrasion and to help maintain the deep, brilliant color characteristics of the glass fibers.

Any coloring agent which is capable of being put into solution or into dispersion with water-miscible organic solvents is within the purview of the compositions of this invention for use on textiles, particularly glass fibers. Such coloring agents include azo pigments, phthalocyanine pigments, aryl-hexylsulfonamide and cyclo-hexylsulfonamide derivates of phthalocyanine pigments, quinacridone pigments, dioxazine pigments, carbon blacks, disperse dye pigments, vat dyes/pigments and solvent soluble dyes. The optimum amount of the coloring agents in the compositions of this invention varies, but generally it is a function of the processing characteristics of the coloring agent, whereas the minimum amount is a function of the desired color depth and/or brightness in the resulting article. In some instances, combinations of the above coloring agents may be employed in the compositions of this invention which are applied to textiles, particularly glass fibers. The coloring agent is generally in particulate form prior to combining it with a water-miscible organic solvent. However, when a water flush is given to glass fibers treated with the colorant-solvent compositions of this invention, while wet, the colorant resides on and between the glass fibers in a particulate form, larger in size than the original particulate form.

Generally, any water-miscible organic solvent may be used with the concepts of this invention. Such water-miscible organic solvents include methanol, ethanol, ethylene glycol, monoethanolamine, dimethylsulfoxide, dimethylformamide, ethylene glycol monomethyl ether and combinations thereof. Depending upon the coloring agent, it is sometimes preferred to use a mixture of solvents, such as dimethylsulfoxide and monoethanolamine or ethylene glycol and monoethanolamine at ratios of from about 3:1 to about 5:1. The solutions additionally may comprise up to about 5 percent by weight of a caustic solution comprising 20 percent by weight of sodium hydroxide in methyl alcohol or 50 percent by weight of sodium hydroxide in water. The selection of the various water-miscible organic solvent(s) is dependent upon their polarity and solvent power required for solubilizing and/or dispersing specific coloring agents.

DESCRIPTION OF THE PREFERRED EMBODIMENTS

In the examples below there are shown compositions of this invention, comprising particular colorants, in the form of a solution, a dispersion or a combination of solution/dispersion. The compositions may be altered simply by increasing the concentration of the colorants beyond their solubility parameters or by using different water-miscible organic solvents or combinations thereof. The colorant on the textile, after being flushed with water, is a particulate, even though the original colorant may not be a particulate.

The examples show the use of various coloring agents, but the invention is not limited to the named classes of coloring agents. As long as a specific coloring agent can be associated with a water-miscible solvent, in the form of a solution, dispersion or a partial solution/dispersion and as long as the coloring agent remains as a particulate, after the water flush, on the pretreated textiles, particularly glass fibers, it is usable under the concepts of this invention.

Some of the compositions in the examples were applied to glass fiber fabrics which had been heat cleaned to remove the original protective sizing and which heat-cleaned fabrics were then treated with an organic material to help receive the coloring agent. The organic material may be any conventional finish or simply a resin, plastisol, polymer, or copolymer, alone or in combination with lubricants or other like materials which are capable of being applied to glass fiber fabrics. Additionally, some of the compositions in the examples were applied to greige glass fiber fabrics, yarns and strands which have the original sizing or protective material thereon. The glass fiber fabrics varied in weave construction, texture, fiber diameter and fiber count to further demonstrate the applicability of the concepts of this invention. Furthermore, some of the compositions in the examples were applied to advancing glass fiber strands, yarns and fabrics and to wound packages of yarn and fabric. Still other compositions in the examples were applied to other textiles, including cotton, polyester, rayon, wool and blends thereof without having to pretreat the textiles with an organic material. In a few instances, the compositions of this invention were applied to heat cleaned or bare glass fiber surfaces, particularly fabric, to demonstrate that some color is attainable without an organic pretreatment, but the color was not as brilliant or deep as the color on the pretreated glass fibers.

The particular coloring agents in the examples are described by their color index names and color index numbers when possible, as identified in a book entitled, "Colour Index", 3rd Edition, 1971, published by The Society of Dyers and Colourists. Where no color index names or numbers are available, supplier and trade designation are given.

A high speed homogenizer mixer is desired when dispersing particulate colorants in the water-miscible organic medium, and it is especially desired when a high concentration of pigment is to be dispersed. In other words, when the colorant-solvent composition of this invention are solutions, it is not necessary, but it may be desirable to use a high speed homogenizer mixer, but when the colorant-solvent compositions are partial or full dispersions, a high speed homogenizer mixer is generally required.

Example I

| Ingredients | Percent by Weight |
| --- | --- |
| Azo pigment | 2.4 |
| Dimethylsulfoxide | 77.0 |
| Monoethanolamine | 19.2 |
| Caustic solution (50% sodium hydroxide in water) | 1.4 |

The above constituents were mixed at room temperature, until the azo pigment, identified as Color Index Pigment Orange 1 (Color Index Number 11725), went into solution. It was observed that a bathochromatic shift of color occurred from yellow to orange when the azo pigment went into solution. Glass fiber fabric, pretreated with a stearato chromic chloride solution, and dried, was immersed for about one minute in the above composition until the fabric became uniformly orange. Excess solution was squeezed from the fabric. The fabric, while still wet, was then immersed in an aqueous 3 percent acetic acid solution. A deep shade of yellow was produced uniformly throughout the fabric during the immersion in the acid solution. The colored fabric was then dried and exposed to various tests, such as washing and exposure to ultraviolet light. After repeated washings and exposure to light, the colored fabric showed excellent lightfastness, washfastness and crockfastness.

Example II

| Ingredients | Percent By Weight |
| --- | --- |
| Azo pigment | 2.4 |
| Dimethylsulfoxide | 72.2 |
| Monoethanolamine | 24.0 |
| Caustic solution (50% sodium hydroxide in water) | 1.4 |

The above constituents were mixed above room temperature, at about 85°C. until the azo pigment, identified as Color Index Pigment Yellow 5 (Color Index Number 11660), went into solution; the solution turned an orange color. Glass fiber yarn was pretreated with an aqueous solution of a chromium complex of stearic acid, dried and cured. The cured pretreated glass fiber yarn was advanced through the above colorant-solvent solution whereby the glass yarn became uniformly orange. Excess composition was removed from the yarn. The yarn, while wet with the colorant-solvent composition, was immersed in an aqueous 3 percent formic acid solution. The colored yarn, after being dried, was woven into fabric. The colored fabric exhibited excellent washfastness, lightfastness and crockfastness.

Example III

| Ingredients | Percent By Weight |
| --- | --- |
| Azo pigment | 2.0 |
| Ethylene glycol | 80.9 |
| Monoethanolamine | 16.1 |
| Caustic solution (50% sodium hydroxide in water) | 1.0 |

The above constituents were mixed at room temperature until the azo pigment, (no Color Index Name or Number) commercially available from American Hoechst Corporation, under the trade designation HANSA YELLOW 10 GX, went into solution. The pigment turned orange in solution. Glass fiber yarn, having a dried, protective coating of a conventional starch-oil sizing thereon, was advanced from a package into a bath of the above solution. Excess solution was removed from the yarn via suitable means such as a die or squeeze rolls and was returned to the bath. Subsequently, the colored yarn, while wet, was immersed in an aqueous bath comprising about 3 percent formic acid; a bright yellow color developed throughout the yarn. The yarn was then dried and collected on a suitable package. The yarn subsequently was woven into fabric, and the fabric was exposed to repeated washings and rinsings at about 140°F. The fabric so exposed, exhibited excellent lightfastness, washfastness and crockfastness.

EXAMPLE IV

The colorant-solvent solution of Example III was used to treat greige glass fiber fabric which had not been exposed to heat to remove the protective coating or sizing therefrom. The procedure was the same as the procedure for treating the yarn. The result was a uniformly colored fabric possessing a bright yellow color. The fabric possessed excellent washfastness, crockfastness and lightfastness properties.

EXAMPLE V

The colorant-solvent solution of Example III was used to treat wound packages of glass fiber yarn, which yarn comprises twisted and plied strands of glass fibers. The glass fiber yarn had not been treated to remove the dried, protective coating or sizing which was applied thereto in the forming of the glass fibers and subsequently dried on the glass fibers, so that the coated glass fibers could withstand subsequent processing operations. The packages were immersed in the colorant-solvent solution wherein the solution was pumped through the package via suitable mechanical means to insure uniformity of color of the yarn on the packages. The packages were then drained of excess solution and subsequently rinsed by pumping acidified water through the package until the colorant in solution was precipitated between and onto the glass fibers of the yarn.

Example VI

| Ingredients | Percent By Weight |
| --- | --- |
| Azo pigment | 1.0 |
| Monoethanolamine | 10.0 |
| Caustic solution (20% sodium hydroxide in methyl alcohol) | 0.25 |
| Dimethylsulfoxide | Balance |

Example VII

| Ingredients | Percent By Weight |
| --- | --- |
| Azo pigment | 1.0 |
| Caustic solution (20% sodium hydroxide in methyl alcohol) | 0.5 |
| Dimethylsulfoxide | Balance |

Example VIII

| Ingredients | Percent by Weight |
| --- | --- |
| Azo pigment | 10.0 |
| Caustic solution (20% sodium hydroxide in methyl alcohol) | 5.0 |
| Dimethylsulfoxide | Balance |

The azo pigment in Examples VI, VII and VIII is identified as Color Index Pigment Orange 34 (Color Index Number 21115). Examples VI and VII, having a low amount of pigment present in the colorant-solvent composition, are complete solutions, whereas Example VIII, having a larger amount of pigment present, is a partial solution/dispersion. The compositions of Examples VI, VII and VIII were applied to greige glass fiber fabrics and the colored fabrics were then subjected to a water spray until the solvent from the compositions was removed from the fabrics which thereby precipitated the colorants onto and between the glass fibers of the fabrics.

Example IX

| Ingredients | Percent By Weight |
| --- | --- |
| Azo pigment | 1.0 – 4.0 |
| Caustic solution (20% sodium hydroxide in methyl alcohol) | 0.25 – 1.0 |
| Dimethylsulfoxide | Balance |

Example X

| Ingredients | Percent By Weight |
| --- | --- |
| Azo pigment | 1.0 – 4.0 |
| Caustic solution (20% sodium hydroxide in methyl alcohol) | 0.25 – 1.0 |
| Dimethylformamide | Balance |

The azo pigment in Examples IX and X is not identified by color index pigment name or number, but it is commercially available from American Hoechst Corporation, under the trade designation, BORDEAUX VB. Example IX is a complete solution and the same is true if dimethylformamide is used in place of dimethylsulfoxide. However, Example X is a complete dispersion, and the same is true if dimethylsulfoxide is used in place of dimethylformamide, without the use of caustic. The colorant-solvent compositions of Examples IX and X were applied to untreated cotton fabric via padder rollers. The colored fabric was immersed in a water bath to rid the fabric of solvent, whereby the colorant precipitated, in situ, on and within the fabric.

Example XI

| Ingredients | Percent By Weight |
| --- | --- |
| Azo pigment | 2.0 |
| Caustic solution (20% sodium hydroxide in methyl alcohol) | 1.5 |
| Dimethylsulfoxide | Balance |

Example XII

| Ingredients | Percent By Weight |
| --- | --- |
| Azo pigment | 8.0 |
| Caustic solution (20% sodium hydroxide in methyl alcohol) | 3.0 |
| Dimethylsulfoxide | Balance |

The azo pigment in Examples XI and XII is identified as Color Index Pigment Red 112 (Color Index Number 12370). Example XI is a complete solution, whereas Example XII is a partial solution/dispersion. The colorant-solvent compositions of Examples XI and XII were applied to untreated polyester fabric via padder rollers. The colored fabric was immersed in water to expel the solvent from the composition on the fabric and to precipitate the pigment, in situ, on and within the fabric.

Example XIII

| Ingredients | Percent By Weight |
| --- | --- |
| Azo pigment | 0.1 – 3.0 |
| Caustic solution (20% sodium hydroxide in methyl alcohol) | 0.05 – 1.5 |
| Dimethylsulfoxide | Balance |

Example XIV

| Ingredients | Percent By Weight |
| --- | --- |
| Azo pigment | 0.1 – 3.0 |
| Caustic solution (20% sodium hydroxide in methyl alcohol) | 0.1 – 3.0 |
| Dimethylformamide | Balance |

The azo pigment in Examples XIII and XIV is identified as Color Index Pigment Yellow 97 (no Color Index Number), and is commercially available from American Hoechst Corporation under the trade designation, PERMANENT YELLOW FGL. Examples XIII and XIV are complete solutions. The compositions were mixed at room temperature and then applied to wool fabric according to the concepts of this invention. A deep, brilliant color developed throughout the fabrics.

Example XV

| Ingredients | Percent By Weight |
| --- | --- |
| Phthalocyanine green pigment | 0.1 – 10.0 |
| Dimethylsulfoxide | Balance |

The above constituents were mixed with a high shear mixer until a uniform dispersion of the phthalocyanine pigment, identified as Color Index Pigment Green 36 (Color Index Number 71460, which has been chlorinated and brominated), was obtained. A greige glass fiber fabric was immersed in the dispersion until a uniform green color was obtained throughout the fabric. The colored fabric, while wet, was then immersed in water, whereby it appeared that the water destroyed the dispersion to cause pigment particles to agglomerate and to be deposited on the surfaces of the glass fibers of the yarn of the fabric. A brilliant, deep green color was produced throughout the fabric. Excellent washfastness, crockfastness and lightfastness properties of the colored glass fiber fabric resulted, even though the dye was dispersed, rather than solubilized in the solvent.

Example XVI

| Ingredients | Percent By Weight |
| --- | --- |
| Phthalocyanine blue pigment | 0.1 – 10.0 |
| Dimethylsulfoxide | Balance |

The phthalocyanine pigment in Example XVI is identified as Color Index Pigment Blue 15 (Color Index Number 74160). The colorant-solvent composition is a full dispersion. The mixing procedure was the same as in Example XV. Similarly, the composition was applied to greige glass fiber fabric as in Example XV. A brilliant, deep blue color was produded throughout the fabric.

Example XVII

| Ingredients | Percent By Weight |
| --- | --- |
| Cyclo-hexylsulfonamide derivative of phthalocyanine pigment | 0.1 – 10.0 |
| Dimethylsulfoxide | Balance |

The colorant in Example XVII has no color index name or number, but it is available from American Hoechst Corporation under the trade designation, BLUE PSCH. This colorant-solvent composition is a complete solution. Rayon fiber was immersed in the colorant-solvent composition until a uniform blue color was obtained. Subsequently, the colored fabric, while wet, was flushed with water whereby a brilliant, deep blue color resulted.

The following examples are indicative of other types of coloring agents which are capable of being combined with a water-miscible solvent(s) for use under the concepts of this invention. In each instance, the compositions from the respective examples were mixed and applied to greige glass fiber fabrics as described above. Deep, brilliant shades of the respective colors resulted. In addition, as a basis for comparison, bare, untreated, heat-cleaned glass fiber fabrics were treated with the compositions of the following examples. Colored fabrics resulted but the color was not deep or brilliant.

Example XVIII

| Ingredients | Percent By Weight |
| --- | --- |
| Quinacridone pigment | 0.1 – 6.0 |
| Caustic solution (20% sodium hydroxide in methyl alcohol) | 0.1 – 4.0 |
| Dimethylsulfoxide | Balance |

The quinacridone pigment is identified as Color Index Pigment Red 122 (no Color Index Number) and it is commercially available from American Hoechst Corporation under the trade designation, HOSTAPERM PINK E. The colorant-solvent composition is mostly in solution.

Example XIX

| Ingredients | Percent By Weight |
|---|---|
| Dioxazine pigment | 0.1 – 6.0 |
| Dimethylsulfoxide | Balance |

The dioxazine pigment is identified as Color Index Pigment Violet 23 (no Color Index Number) and it is commercially available from American Hoechst Corporation under the trade designation, HOSTAPERM VIOLET RL. The colorant-solvent composition is a full dispersion.

Example XX

| Ingredients | Percent By Weight |
|---|---|
| Vat dye | 0.1 – 3.0 |
| Caustic solution (20% sodium hydroxide in methyl alcohol) | 0.1 – 3.0 |
| Dimethylsulfoxide | Balance |

The vat dye is identified as Color Index Vat Orange 7, (Color Index Number 71105). The colorant-solvent composition is mostly a dispersion.

Example XXI

| Ingredients | Percent By Weight |
|---|---|
| Disperse dye pigment | 2.0 |
| Caustic solution (20% sodium hydroxide in methyl alcohol) | 1.0 |
| Dimethylsulfoxide | Balance |

The disperse dye pigment is identified as Color Index Disperse Yellow 42 (Color Index Number 10338). The colorant-solvent composition is a complete solution.

Example XXII

| Ingredients | Percent By Weight |
|---|---|
| Solvent soluble dye | 2.0 – 6.0 |
| Dimethylsulfoxide | Balance |

The solvent soluble dye has no color index name or number, but it is commercially available from American Hoechst Corporation under the trade designation, HOSTADYE FAST BLUE FLE. The colorant-solvent solution is a complete solution.

Example XXIII

| Ingredients | Percent By Weight |
|---|---|
| Solvent soluble dye | 2.0 – 6.0 |
| Dimethylsulfoxide | Balance |

The solvent soluble dye has no color index name or number, but it is commercially available from American Hoechst Corporation under the trade designation, HOSTADYE GREEN 3G. The colorant-solvent composition is a complete solution.

Example XXIV

| Ingredients | Percent By Weight |
|---|---|
| Solvent soluble dye | 2.0 – 6.0 |
| Dimethylsulfoxide | Balance |

The solvent soluble dye has no color index name or number, but it is commercially available from American Hoechst Corporation under the trade designation, HOSTADYE BLACK RE. The colorant-solvent composition is a complete solution.

Example XXV

| Ingredients | Percent By Weight |
|---|---|
| Carbon black | 1.0 – 6.0 |
| Dimethylsulfoxide | Balance |

The carbon black has no color index name or number, but it is commercially available from Cities Service Company, under the trade designation, COLOIDEX No. 5. The colorant-solvent composition is a full dispersion.

In the following examples, heat-cleaned glass fiber fabric was pretreated with various conventional finishes and dried, prior to applying the colorant-solvent compositions thereto. The colorant-solvent compositions were applied to the petreated fabrics via pad rolls, and while wet, the colored fabrics were passed through a water bath. Deep, bright colors resulted.

Example XXVI

| Ingredients | Percent By Weight |
|---|---|
| Azo pigment | 4.0 – 10.0 |
| Caustic solution (20% sodium hydroxide in methyl alcohol) | 1.5 – 5.0 |
| Ethylene glycol monomethylether | Balance |

The azo pigment in Example XXVI is identified as Color Index Pigment Red 8 (Color Index Number 12335). The above constituents were mixed under high shear until a partial solution resulted.

Example XXVII

| Ingredients | Percent By Weight |
|---|---|
| Azo pigment | 8.0 |
| Caustic solution (20% sodium hydroxide in methyl alcohol) | 4.0 |
| Ethylene glycol monomethylether | Balance |

The azo pigment in Example XXVII is identified as Color Index Pigment Orange 34 (Color Index NUmber 21115). The above constituents were mixed under high shear until a partial solution resulted.

Example XXVIII

| Ingredients | Percent By Weight |
|---|---|
| Vat pigment | 0.1 – 6.0 |
| Dimethylsulfoxide | Balance |

The vat pigment is identified as Color Index Vat Orange 7, (Color Index Number 71105). The vat dye is the condensation production of naphthalene tetracarboxylic acid with o-phenylenediamine. The colorant-solvent composition is mostly a dispersion.

Example XXIX

| Ingredients | Percent By Weight |
| --- | --- |
| Azo yellow pigment | 3.0 |
| Phthalocyanine green pigment | 0.375 |
| Vat orange pigment | 1.0 |
| Caustic solution (20% sodium hydroxide in methyl alcohol) | 3.0 |
| Dimethylsulfoxide | Balance |

The azo yelow pigment is identified as Color Index Yellow 97 (no Color Index Number) and it is commercially available from American Hoechst Corporation under the trade designation PERMANENT YELLOW FGL. The phthalocyanine green pigment is identified as Color Index Pigment Green 36 (Color Index Number 74160, which has been chlorinated and brominated), and it is commercially available under the trade designation HOSTAPERM GREEN 8G. The vat orange pigment is identified as Color Index Vat Orange 7 (Color Index Number 71105). The colorant-solvent composition comprises having the yellow pigment in solution, the green pigment in dispersion and the orange pigment partially in solution and partially in dispersion. A pleasant gold color developed on the glass fiber fabric.

Example XXX

| Ingredients | Percent By Weight |
| --- | --- |
| Phthalocyanine blue pigment | 4.5 |
| Phthalocyanine green pigment | 1.5 |
| Dimethylsulfoxide | Balance |

The phthalocyanine blue pigment is identified as Color Index Pigment Blue 15 (Color Index Number 74160) and it is commercially available from American Hoechst Corporation under the trade designation HOSTAPERM BLUE A2R. The phthalocyanine green pigment is identified as Color Index Pigment Green 36 (Color Index Number 74160, which has been chlorinated and brominated) and it is commercially available from American Hoechst Corporation under the trade designation, HOSTAPERM GREEN 8G. The colorant-solvent composition is a full dispersion. A wedgewood blue color developed on the glass fiber fabric.

Example XXXI

| Ingredients | Percent By Weight |
| --- | --- |
| Azo yellow pigment | 3.0 |
| Phthalocyanine green pigment | 1.0 |
| Caustic solution (20% sodium hydroxide in methyl alcohol) | 1.5 |
| Dimethylsulfoxide | Balance |

The azo pigment is identified as Color Index Yellow 97 (no Color Index Number) and it is commercially available from American Hoechst Corporation under the trade designation, PERMANENT YELLOW FGL. The phthalocyanine pigment is identified as Color Index Pigment Green 36 (Color Index Number 74160, which has been chlorinated and brominated), and it is commercially available under the trade designation, HOSTAPERM GREEN 8G. The colorant-solvent composition comprises having the yellow pigment in solution and the green pigment in dispersion. A lime green olor developed on the glass fiber fabric.

Example XXXII

| Ingredients | Percent By Weight |
| --- | --- |
| Azo yellow pigment | 0.75 |
| Azo red pigment | 0.25 |
| Monoethanolamine | 5.0 |
| Dimethylsulfoxide | Balance |

The azo yellow pigment is identified as Color Index Yellow 97 (no Color Index Number) and it is commercially available from American Hoechst Corporation under the trade designation, PERMANENT YELLOW FGL. The azo red pigment is identified as Color Index Pigment Red 9 (Color Index Number 12460) and it is commercially available from American Hoechst Corporation under the trade designation, PERMANENT RED FRLL. The colorant-solvent composition is a complete solution. A yellowish-orange color developed on the glass fiber fabric.

The concepts of this invention extend to the glass fiber forming operation, prior to gathering the newly formed glass filaments into a strand. Specifically, a multiplicity of glass filaments are formed, by attenuating molten glass emitting from a plurality of openings or tips on a feeder. The formed glass filaments, prior to being gathered into a strand are treated with an organic material and dried, prior to applying a colorant-solvent composition of this invention to the glass filaments. A water spray is directed at the colored glass filaments to cause precipitation and/or agglomeration, in situ, on the glass filaments, and subsequently, the colored glass filaments are gathered into a strand. The strand is then collected onto a package by winding at fast speeds and the package is then dried.

Likewise, the concepts of this invention extend to post-forming operations, such as to beams of glass fibers. A beam of glass fibers is a large spool containing a multiplicity of sized glass fiber strands. The glass fiber strands are unwound from the spool, subjected to the compositions and procedures of this invention, comprising subjecting the strands to a colorant-solvent composition, applying a water flush to the colored strands, drying the strands and rewinding the colored strands onto a similar spool.

More than one colorant may be used in the composition of this invention to obtain intermediate colors. In addition, when multiple colorants are in the composition, they may be in solution or dispersion or in a partial solution/dispersion, or one may be in solution and the other(s) in dispersion.

The concepts of this invention are generally directed to treating textile materials with a single application of the colorant-solvent composition to obtain deep, brilliant colors. This is mainly due to the economics involved in processing colored textile materials. However, there are instances when multiple applications of the same or differently colored colorant-solvent compositions to the textile material are desired to vary the color effect on the textile material.

When more than one application of the same colorant-solvent composition or differently colored compositions are applied to the same article, it is generally preferred to dry the previously colored article, after the water flush, prior to applying an additional colorant-solvent composition thereto. However, there are instances when one colorant-solvent composition is applied to an article, followed by the application of a differently colored composition thereto, prior to applying the water flush to the article.

When a textured glass fiber yarn and fabric made therefrom are treated with differently colored compositions, the yarn and fabric distinctively possess both colors to give a unique effect of softness of color along with depth of color, due to the partial blending of the colors.

Natural and synthetic fibers and blends thereof when treated according to the concepts of this invention, do not need a pretreatment to help receive the colorant. These fibers are generally porous and possess absorptive properties, whereas glass fiber surfaces are smooth and do not possess absorptive properties, thereby requiring the glass fibers to have a pretreatment to help receive the colorant. In most instances, fibers other than glass fibers do not require a post-treatment, after coloring to help maintain the durability of the color on the fibers. However, with glass fibers, a post-treatment with any conventional finish is generally required to help maintain the durability.

The compositions of this invention are applied to textiles, particularly glass fibers, via known techniques, such as with padders, dies, or by dipping, impregnation, silk screening, kiss-printing and the like.

We claim:

1. A method of coloring glass fibers, comprising: wetting the surface of glass fibers with a polar water miscible organic solvent that carries an organic water insoluble coloring agent therein; neutralizing the polarity of said polar organic solvent in situ on said fibers with water and extracting said polar organic solvent from the wetted surface of said fibers with the water leaving said water insoluble coloring agent as a thin tight coating on the surface of said fibers; and fixing said coating of coloring agent in situ on the surface of said fibers.

2. The method of claim 1 including the step of: applying a cationic material to said glass fibers before wetting with said polar water miscible organic solvent that carries the organic coloring agent.

3. The method of claim 1 wherein said wetting step is performed with a solution of the coloring agent in the polar water miscible organic solvent.

4. The method of claim 1 wherein said polar water miscible organic solvent comprises a dialkylsulfoxide.

5. The method of claim 1 wherein said polar water miscible organic solvent comprises a dialkylamide.

6. The method of claim 4 wherein said polar solvent is dimethylsulfoxide.

7. The method of claim 5 wherein said polar solvent is dimethylformamide.

8. The method of claim 6 wherein said solvent comprises a mixture of dimethylsulfoxide and monoethanolamine.

9. The method of claim 1 wherein said polar organic solvent is ethylene glycol monomethylether.

10. The method of claim 1 wherein said fixing step comprises: applying a water insoluble generally transparent finish over the top of said coating of coloring agent on said fibers.

11. The method of dyeing a bundle of glass fibers comprising: applying a solution of an organic water insoluble coloring agent in a polar water miscible organic solvent to the outside surface of the bundle; providing conditions whereby said solution penetrates the voids between fibers of said bundle and wets out the surfaces of fibers inside said bundle with a film of said solution, flushing water through said bundle to neutralize the polarity of said polar organic solvent in said film, and extracting said polar solvent with water to leave the coloring agent of said film in situ upon the surface of the fibers.

12. The method of claim 11 followed by a fixing step comprising: applying a water insoluble generally transparent finish over the top of said coating of coloring agent on said fibers.

13. The method as claimed in claim 11, wherein the water-miscible organic solvent comprises a mixture of dimethylsulfoxide and monoethanolamine in a ratio of from about 3:1 to about 5:1 and sufficient caustic solution to aid in solubilizing at least some of the coloring agent.

14. The method as claimed in claim 11, wherein the water-miscible organic solvent comprises a mixture of ethylene glycol and monoethanolamine in a ratio of from about 3:1 to about 5:1 and sufficient caustic solution to partially solubilize the coloring agent.

15. The method as claimed in claim 11, wherein the water-miscible organic solvent is selected from the group consisting of methanol, ethanol, ethylene glycol, monoethanolamine, dimethylsulfoxide, dimethylformamide, ethylene glycol monomethylether and combinations thereof.

16. The method as claimed in claim 11, wherein the coloring agent is selected from the group consisting of azo pigments, phthalocyanine pigments, aryl-hexylsulfonamide derivatives of phthalocyanine pigments, cyclo-hexylsulfonamide derivatives of quinacridone pigments, dioxazine pigments, carbon blacks, disperse dye pigments, vat dyes, solvent soluble dyes and combinations thereof.

17. Colored textile material having: a coating of an organic water insoluble coloring agent precipitated in situ thereon from an organic solution, and a protective layer of a generally transparent resinous material over the top of said precipitated coating of organic coloring agent.

18. The colored textile material as claimed in claim 17, wherein the coloring agent is selected from the group consisting of azo pigments, phthalocyanine pigments, aryl-hexylsulfonamide derivatives of phthalocyanine pigments, cyclo-hexylsulfonamide derivatives of quinacridone pigments, dioxazine pigments, carbon blacks, disperse dye pigments, vat dyes, solvent soluble dyes and combinations thereof.

19. The colored textile material as claimed in claim 17, wherein the textile material comprises natural and synthetic fibers selected from the group consisting of glass fibers, cotton fibers, polyester fibers, rayon fibers, wool fibers and combinations thereof.

20. Colored glass fibers having: a cationic coating thereon, a coating of an organic water insoluble coloring agent precipitated in situ on said cationic coating from an organic solution, and a protective layer of a generally transparent resinous material over the top of said precipitated coating of organic coloring agent.

21. The colored glass fibers as claimed in claim 20, wherein the coloring agent is selected from the group consisting of azo pigments, phthalocyanine pigments, aryl-hexylsulfonamide derivatives of phthalocyanine pigments, cyclo-hexylsulfonamide derivatives of quinacridone pigments, dioxazine pigments, carbon blacks, disperse dye pigments, vat dyes, solvent soluble dyes and combinations thereof.

22. A bundle of glass fibers having: a cationic coating on the fibers of said bundle, a coating of an organic water insoluble coloring agent precipitated in situ from an organic solution on the surface of the cationic coating of the fibers in said bundle, and a protective layer of a generally transparent resinous material over the top of said bundle.

23. The colored glass fibers as claimed in claim 22, wherein the coating material comprises an organic material selected from the group consisting of Werner complexes, starch-oil sizings, polymeric sizings, organo silanes and conventional finishes.

24. The colored glass fibers as claimed in claim 22, wherein the bundle comprises greige glass goods selected from the group consisting of single-end yarns, rovings, fabrics, beams and packages of wound single-end yarns.

* * * * *